UNITED STATES PATENT OFFICE.

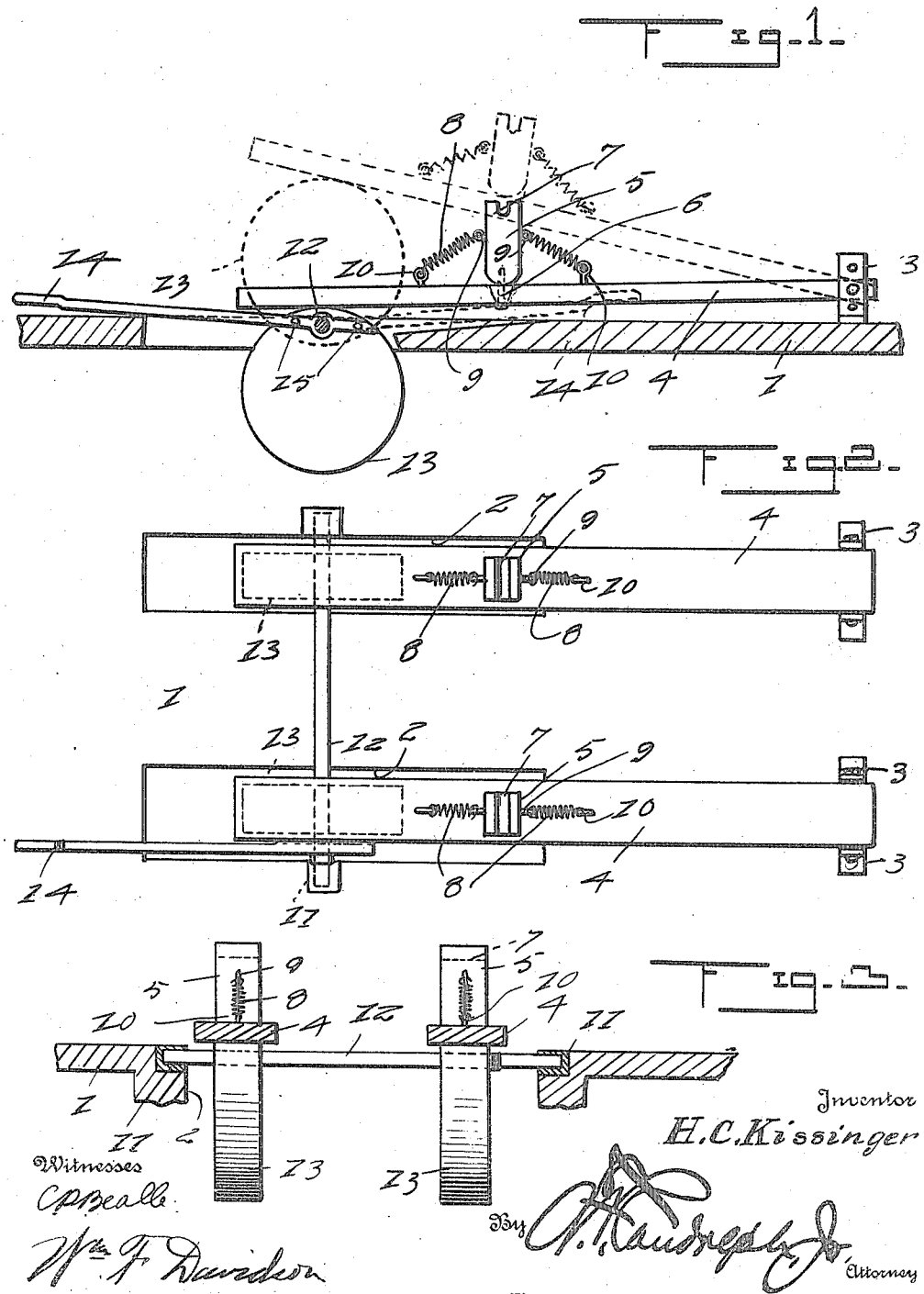

HARRY C. KISSINGER, OF POLK, WISCONSIN.

ROLLER-TRUCK TIRE-SAVER.

1,266,819.  Specification of Letters Patent.  Patented May 21, 1918.

Application filed April 18, 1917. Serial No. 162,978.

*To all whom it may concern:*

Be it known that I, HARRY C. KISSINGER, a citizen of the United States, residing at Polk, in the county of Washington and State of Wisconsin, have invented certain new and useful Improvements in Roller-Truck Tire-Savers; and I do hereby declare the following to be a full, clear, and exact description of the invention, such as will enable others skilled in the art to which it appertains to make and use the same.

This invention relates to a roller truck tire saving jack and has for one of its objects the provision of a device of this character, especially adapted to elevate the rear wheels of an automobile or like vehicle.

Another object of this invention is the provision of a pair of relatively spaced members permanently secured to a flooring of a garage or like building and having means thereon for engagement with the axle of an automobile, whereby upon swinging the members upwardly, upon their pivots, the automobile will be elevated, thus relieving the weight of the automobile upon the tires thereof when the automobile is in non-use.

A further object of this invention is the provision of a pair of eccentrically mounted wheels journaled in the flooring of the garage or like building and adapted to engage the free ends of the members, whereby upon rotating the wheels, the free ends of the members will be elevated to raise the automobile wheels from engagement with the ground, thus relieving the weight or strain upon the tires thereof.

A still further object of this invention is the provision of a roller truck tire saver of the above stated character, which shall be simple, durable and efficient, and which may be manufactured and sold at a comparatively low cost.

With these and other objects in view, as will become more apparent as the description proceeds, the invention consists of the certain novel features of construction, combination and arrangement of parts as will be hereinafter more fully described and claimed.

For a complete understanding of my invention, reference is to be had to the following description and accompanying drawing, in which:

Figure 1 is a longitudinal sectional view of a roller truck tire saver, constructed in accordance with my invention, Fig. 2 is a top plan view of the same, Fig. 3 is a transverse sectional view illustrating the means for journaling the eccentric wheels to the flooring of a garage or building, to which my invention is applied.

Referring in detail to the drawing, the numeral 1 indicates the flooring of a garage or like building having a pair of relatively spaced slots 2 therein. Pairs of relatively spaced supporting brackets 3 are secured to the flooring 1 at a point adjacent the slots 2 and in horizontal alinement therewith.

Members 4 are adjustably and pivotally secured to the pairs of supporting brackets 3 and have their free ends overlying the slots 2 of the flooring 1. Blocks 5 are secured to the members 4 by fasteners 6 and have their upper free ends grooved as at 7 to receive the truss rod upon the differential housing or rear axle of an automobile or like vehicle.

The blocks 5 are supported in a vertical position by the coiled springs 8, which are connected to the blocks as shown at 9 by eye-bolts to the members 4 by eye-bolts 10.

Journals 11 are secured to the flooring 1 upon opposite sides of the slots 2 and rotatably receive a shaft 12. The shaft 12 has wheels 13 eccentrically secured thereto which are adapted to engage the under faces of the members 4, as shown in Figs. 1 and 3. An operating lever 14 is secured to the shaft 12 and to one of the wheels 13 as shown at 15, and is adapted to be swung in the arc of a circle for the purpose of rotating the shaft 12 and the wheels 13, which are eccentrically mounted upon the shaft, to cause said wheels to elevate the free ends of the members 4.

In operation, the automobile or like vehicle is driven to straddle the members 4 so as to position the blocks 5 directly under the rear axle, permitting the truss rod thereof to be received within the grooves 7. By swinging the operating lever 14 in the arc of a circle to occupy a position as shown in dotted lines in Fig. 1, the eccentrically mounted wheels 13 are rotated causing the free ends of the members 4 to be elevated in a position as shown in dotted lines in Fig. 1, elevating the rear end of the automobile from engagement with the flooring 1 of the garage or building, thus relieving the strain and weight upon the tires.

While I have shown and described the preferred embodiment of my invention, it will be understood that minor changes in construction, combination and arrangement of parts may be made without departing from the spirit and scope of the invention as claimed.

Having thus described my invention, I claim:

1. A device of the character set forth comprising a pair of relatively spaced members, means for pivotally and adjustably connecting the members to the flooring of a building, blocks secured to the members and having grooves therein to receive and support the truss rod and rear axle of an automobile, coiled springs connected to the members and blocks for supporting said blocks in a vertical position, and means for elevating the free ends of said members to elevate the automobile.

2. A device of the character set forth comprising a flooring having a pair of relatively spaced elongated slots, brackets secured to the floor and in line with said slots, a pair of relatively spaced members pivoted to said brackets and having their free ends disposed over the slots, a shaft journaled in the flooring and extending through the slots, eccentric wheels secured to said shaft and engaging the free ends of said members, blocks connected to the relatively spaced members and having grooves therein to receive the axles of an automobile, coil springs secured to said blocks and to the relatively spaced members to support said blocks in a vertical position and to permit slight movement thereof, and means rotating the shaft to cause the eccentric wheels to elevate the relatively spaced members.

In testimony whereof I affix my signature in presence of two witnesses.

HARRY C. KISSINGER.

Witnesses:
J. H. TERLINDEN, M. D.,
ALF B. FROEHLICH.

Copies of this patent may be obtained for five cents each, by addressing the "Commissioner of Patents, Washington, D. C."